(12) United States Patent
Goyal et al.

(10) Patent No.: US 7,797,313 B1
(45) Date of Patent: Sep. 14, 2010

(54) RELEVANCE RANKING IN A COMPUTER SYSTEM

(75) Inventors: Pawan Goyal, Pune (IN); Srineet Sridharan, Pune (IN); Basant Rajan, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 419 days.

(21) Appl. No.: 11/391,159

(22) Filed: Mar. 28, 2006

(51) Int. Cl.
*G06F 7/00* (2006.01)
*G06F 17/30* (2006.01)

(52) U.S. Cl. .................. 707/723; 707/728; 707/729
(58) Field of Classification Search ............... None
See application file for complete search history.

(56) References Cited

U.S. PATENT DOCUMENTS

| | | | |
|---|---|---|---|
| 2001/0049636 A1* | 12/2001 | Hudda et al. | 705/26 |
| 2003/0158831 A1* | 8/2003 | Zaremba | 707/1 |
| 2005/0060312 A1* | 3/2005 | Curtiss et al. | 707/7 |
| 2005/0097204 A1* | 5/2005 | Horowitz et al. | 709/223 |
| 2006/0242129 A1* | 10/2006 | Libes et al. | 707/3 |
| 2007/0011146 A1* | 1/2007 | Holbrook | 707/3 |
| 2007/0043704 A1* | 2/2007 | Raub et al. | 707/3 |
| 2007/0043750 A1* | 2/2007 | Dingle | 707/101 |
| 2007/0094268 A1* | 4/2007 | Tabe | 707/10 |
| 2007/0136381 A1* | 6/2007 | Cannon et al. | 707/200 |
| 2007/0136541 A1* | 6/2007 | Herz et al. | 711/162 |

* cited by examiner

*Primary Examiner*—Cam Y Truong
*Assistant Examiner*—Dung K Chau
(74) *Attorney, Agent, or Firm*—Campbell Stephenson LLP (57) ABSTRACT

A method and system for generating ranking criteria used to rank items in a computer system. The ranking criteria is based, at least in part, on storage information related to each of the items to be ranked. The storage information includes a storage parameter and/or a backup parameter. In one embodiment, a list of items is received in which storage information associated with each of the items is gathered. The items are ranked according to a relationship between the determined ranking criteria and at least the storage information associated with each of the items.

33 Claims, 9 Drawing Sheets

RELEVANCE RANKING IN A COMPUTER SYSTEM

DESCRIPTION OF THE RELATED ART

Techniques for accessing information have grown in complexity with the growth of computer and communication systems throughout the world. For example, to access information on the Internet, a number of different search engines have been created to examine the available information. Regardless of the search engine technology that is selected for a search, after performing a simple Internet search, a large amount of information is gathered and one becomes aware that we are living in an era where information is swamping our lives.

Beyond the Internet, many organizations (sometimes referred to herein as an "enterprise") use computer systems to manage information regarding and held only within the organization. Management of this information may present problems when it is desired to quickly search the information for specific details. Even when a search is limited to information of a single enterprise, a user can quickly become overwhelmed by an over-supply of information. The information over-supply is a problem because some of the information is relevant, but other information is useless or irrelevant. The useless or irrelevant information perhaps serves to obscure the desired relevant information that is sought. The cost of irrelevant information is not only a loss of time, but can also lead to misjudgment, mistakes and a loss of otherwise good opportunities. If information with high relevance and accuracy is termed "good information" and other information is termed "noise," then the noise/information ratio as time passes is drastically growing larger—even within an enterprise.

What is needed is an improved tool to help filter out the noise from the good information when examining information in a computer system. Existing search engines are designed to perform relevance ranking of electronic data (e.g., search results) based on information openly available on the Internet. However, among other things, existing search engines fail to acknowledge or consider storage information when ranking their search results. In other words, obtaining the most relevant information from an aggregation of data still remains a problem. Further, relevance and quality can be significantly different from organization to organization, depending on various factors.

Many other problems and disadvantages of existing technology will become apparent to one skilled in the art after comparing today's technology with the present invention as described herein.

SUMMARY

Various embodiments of methods and systems for relevance ranking are disclosed. In one embodiment, a method is disclosed for generating ranking criteria to rank items in a computer system. The ranking criteria is based, at least in part, on storage information related to each of the items to be ranked. The storage information includes at least one of a storage parameter and/or a backup parameter. In another example embodiment, a list of items is received in which storage information associated with each of the items is gathered. The items are ranked according to a relationship between the ranking criteria that is determined and at least the storage information associated with each of the items.

An example of a storage parameter includes a storage value and/or a storage policy associated with one of the items. Storage policies of a storage parameter can include storage class and configuration settings in either hardware or software such as mirroring, RAID 5, and so forth. Another example of a storage policy includes information regarding actions, e.g., actions that are to be taken such as replication when an item is stored by a user having particular privileges. Among other information, the storage policy information can include information such as catalog data associated with the item, and a type of storage destination device for the item. Examples of computer-readable storage media, which can be employed in the present invention and serve as a storage destination device for an item, include a storage tape, a CD-ROM, a network drive, a hard disk, a disk array, cache memory, and the like. Examples of a storage value, as opposed to the storage policy that can be selected include an item size, a most recent access time of an item, a list of most recent access times of the item, an actual storage time of the item, and a type of storage destination device used to store the item. An example of a backup parameter, like the storage parameter, can include a backup value and/or a backup policy for one or more of the items. Backup values and policies, as compared to storage values and policies, share a similar relationship.

It should be noted that in other embodiments of the present invention, the storage information can include other parameters relating to the items. For example, parameters sometimes referred to herein as catalog data might be rightly included with either of a storage parameter or a backup parameter. Alternatively, the catalog data may more appropriately fit elsewhere. For example, depending on the character of the storage information stored therein, catalog data may be a parameter that does not fit neatly into the definition of a storage or backup parameter. In this situation, a new category for other parameters can be created within the storage information and can be used to store catalog data. It should be further noted that catalog data can also be stored, in part or in whole, outside of the storage information completely. Catalog data can include data gleaned from backup catalogs such as historical modification and access patterns of files, history of backup frequencies, and metadata values such as item size, attributes, modification, and access time at different periods in the past. Further, example items of a list include instant messaging data, email data, and other user selected data such as files and the like.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

The following is intended to provide a detailed description of an example of the invention and should not be taken to be limiting of the invention itself. Rather, any number of variations may fall within the scope of the invention which is defined in the claims following the description.

Introduction

Using embodiments of the present invention, storage information regarding a computer system is used to determine ranking criteria for ranking items associated with the computer system. Items associated with a computer system can include, for example, files, directories, data backed-up to remote sites, sockets, device files, and other such constructs. In one embodiment, this ranking criteria is used to perform relevance ranking of a list of items such as files or directories that are retrieved, for example, by a search performed with the computer system. As will be appreciated, such a computer system can include a single computer, a local area network (LAN) that includes some number of computers, some number of LANs coupled to one another by a wide area network, some combination thereof, or other aggregation of computers.

Unlike the ranking criteria that is used for the ranking performed by today's search engines, the ranking criteria used in ranking according to one embodiment of the present invention is generated from information that is unavailable, and, in fact, irrelevant to such existing search engines. Since today's search engines do not have access to information available in embodiments of the present invention such as storage information, various types of item metadata, or other item data of an item to be ranked, an existing search engine will not determine (and will not be capable of determining) its ranking criteria based on these types of information. Existing ranking criteria focus on the relationship between search terms that are used to retrieve search items, and the search items that are retrieved in the search. Further, even if information such as storage information were made available to such a search engine, existing search engines' ranking focus on the search terms of the search, and so have neither need nor occasion to consider information such as storage information.

Providing the ability to generate ranking criteria based on available storage information (e.g., only those within an enterprise) offers greater flexibility in determining the factors to consider when ranking items. For example, items that may not appear prominently within a system using existing ranking criteria may be the most relevant or important items of a group of items. Using the ranking criteria of the present invention, the most relevant items retrieved in a search are more likely to appear most prominently among the retrieved search items. Thus, embodiments of the present invention use of the ranking criteria described herein allows the items that should be ranked the highest to appear at the top of a ranked list even though a search using existing technology would have produced a substantially lower ranking. This said, the present invention's ranking criteria need not be used exclusively, and are fully compatible with criteria and considerations in common use today.

Description of Illustrated Embodiment

Figure 1:
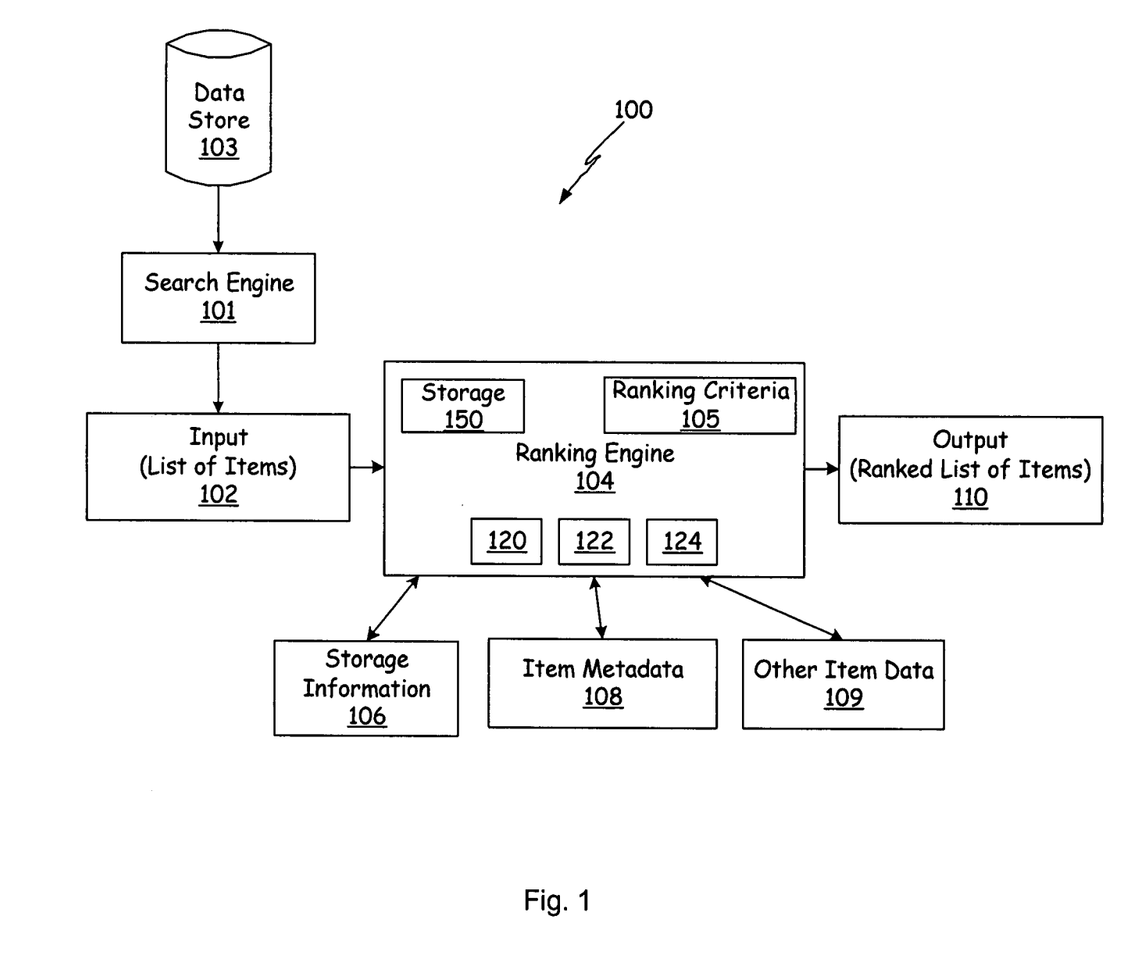
FIG. 1 is a block diagram of a computer system according to one embodiment of the present invention.

FIG. 1 is a block diagram of a computer system 100, having a processor, according to one embodiment of the present invention. In computer system 100, a search engine 101 is illustrated for generating an input (list of items) 102 from a data store 103. Search engine 101 may operate similar to existing search engines in which data store 103 is one or more pools of data that are scanned for particular search terms according to a particular search criteria. The pools of data can be located on different storage devices, across the Internet on different computer systems, in different formats, and so on. Regardless of the precise format, location, state, and so on of data store 103, in the illustrated embodiment, input 102 is presented to a ranking engine 104 where input 102 is ranked and an output (ranked list of items) is generated.

Ranking engine 104 performs ranking according to ranking criteria 105. Ranking criteria 105 is selected based on various elements such as storage information 106, item metadata 108, or other item data 109. As will be described further herein, the weight or importance given to elements 106, 108, and 109, respectively, may impact ranking criteria 105 ultimately used by ranking engine 104 to rank input 102.

Storage information 106 can relate to items generated by search engine 101 or to other configurations in computer system 100. Storage information 106 is described in greater detail with relation to FIG. 2. Item metadata 108 represents other types of information that are related to items such as the catalog data for an item that does not fit into the storage parameters and/or backup parameters employed. Catalog data can include information that is only available from the perspective of a backed-up or stored item such as an item's backup time, or backup device. As will be appreciated, catalog data can also include other information not expressly disclosed herein. Other item data 109 that may be considered when ranking engine 104 selects ranking criteria 105 includes data that is specific to an item. For example, if ranking were to be performed using an integrated approach in which today's ranking criteria technology were blended with storage information 106 of an item, other item data 109 could provide information required for ranking criteria 105.

These heuristics for ranking criteria 105 may also be influenced by various factors such as weight/priority 120 given a particular factor of ranking criteria 105. For example, ranking engine 104 may be requested to give a higher ranking to items that have been accessed most recently, or in relative terms, more recently. In other words, an item from the list of items meeting the search criteria of search engine 101 may be ranked lower because the item has not been accessed as recently as another item that meets the same search criteria; however, backup times for the item may carry a greater weight than access time and if the item was backed up more recently than the item that was accessed more recently, the item may still be given a higher ranking.

For purposes of dealing with issues such as network congestion, list of items 102 may be presented to ranking engine 104 in an encoded format or as an indexed list. If list of items 102 arrives in an encoded format, ranking engine 104 can include an encoder 122 to decode list 102 for ranking engine 104. Further, if list 102 arrives as an indexed list, a hash table 124 can be formed at ranking engine 104 to appropriately order list 102 at ranking engine 104. Other metadata considerations might affect ranking such as catalog data, backup device used for backing up data of list 102, and so on. Ranking criteria 105 can also include certain keywords that appear in a file of list of items 102. Among other things, list of items 102 can include files, instant messaging data, email data, user selected data, and the like. Ranking engine 104 can also include storage 150 to store information such as list of items 102 to be ranked. As will be appreciated, storage 150 can be used to store more than simply storage information 106 for each item. These alternatives can be used singly, or in various combinations.

Figure 2:
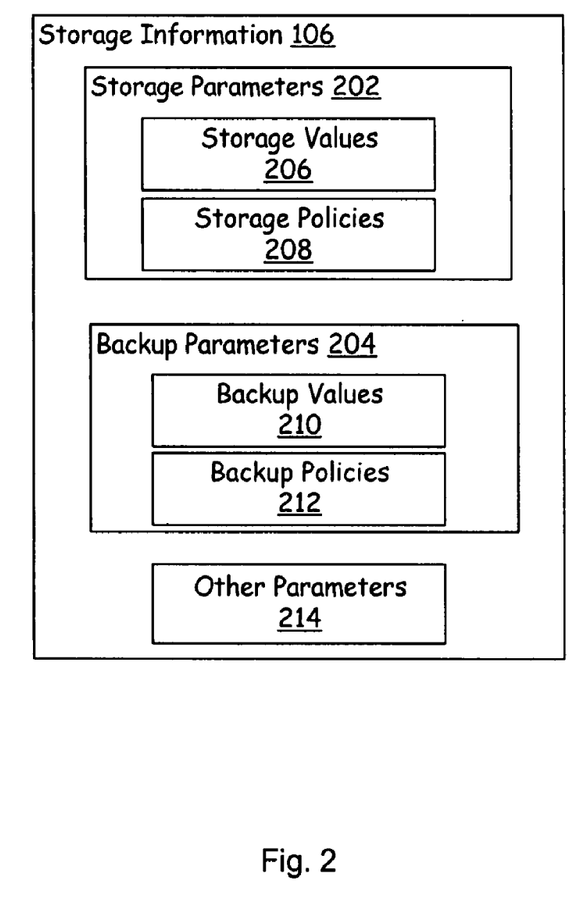
FIG. 2 illustrates an example of storage information of the computer system of FIG. 1.

FIG. 2 illustrates an example of storage information, depicted as storage information 106, of computer system 100 of FIG. 1. Storage information 106 is used for ranking list of items 102 at ranking engine 104. Storage information 106 of FIG. 2 includes storage parameters 202 and backup parameters 204. Storage parameters 202 include storage values 206 and storage policies 208. Backup parameters 204 include backup values 210 and backup policies 212. The term "value," as opposed to "policy," refers to actual information regarding the storage or backup of the item, as opposed to the intended plan for storage or backup of the item, respectively.

For example, a backup policy for an item may identify a time or times that the item is scheduled for back up, a backup destination device type, retention settings for backed up copies of an item, and so forth. This policy would be stored under backup policies 212 and would then be accessed in relation to the item. In contrast, a backup value for the same item identifies, for example, the actual time or times at which the backup or backups occurred. The value is then stored under backup values 210. In addition, backup values 210 can include other information concerning the actual backup times of the item such as the time period required to perform the backup, the amount of data backed up, whether the backup was during a preferred time period, and the like. Backup values 210 will differ from the backup policies 212 if, for example, a scheduled backup were to be delayed, to be skipped for some reason, to fail for some reason (e.g., a backup device fails to perform), or to change in some unscheduled manner. Backup values 210 can be stored separately from the backup policies 212, but both types of backup parameter 204 are intended to be available to the ranking engine 104, if such are to be used for the ranking of list of items 102.

In a similar manner, storage parameters 202 are available to ranking engine 104 as part of storage information 106. Storage policies 208 of storage parameters 202 can include storage class and configuration settings in either hardware or software such as mirroring, RAID 5, and so forth. Storage values 206 can indicate the actual storage class that is implemented and actual configuration setting that are selected.

Further, other parameters 214 can be available to ranking engine 104 in addition to storage parameters 202 and backup parameters 204. For example, in certain embodiments, catalog data is used to indicate historical modification and access patterns of files, history of backup frequencies, and metadata values such as item size, attributes, modification and access time at different times in the past. Further, an amount of item data that is modified between backup times of the item can be used as a parameter in determining ranking of the item. In other embodiments, user privileges of a user that accesses data of an item could be a parameter for ranking engine 104 to consider in the ranking. As will be apparent to one of skill in the art, in light of the present disclosure, a wide variety of characteristics related to storage information 106 can be taken into consideration when ranking items.

Figure 3A:
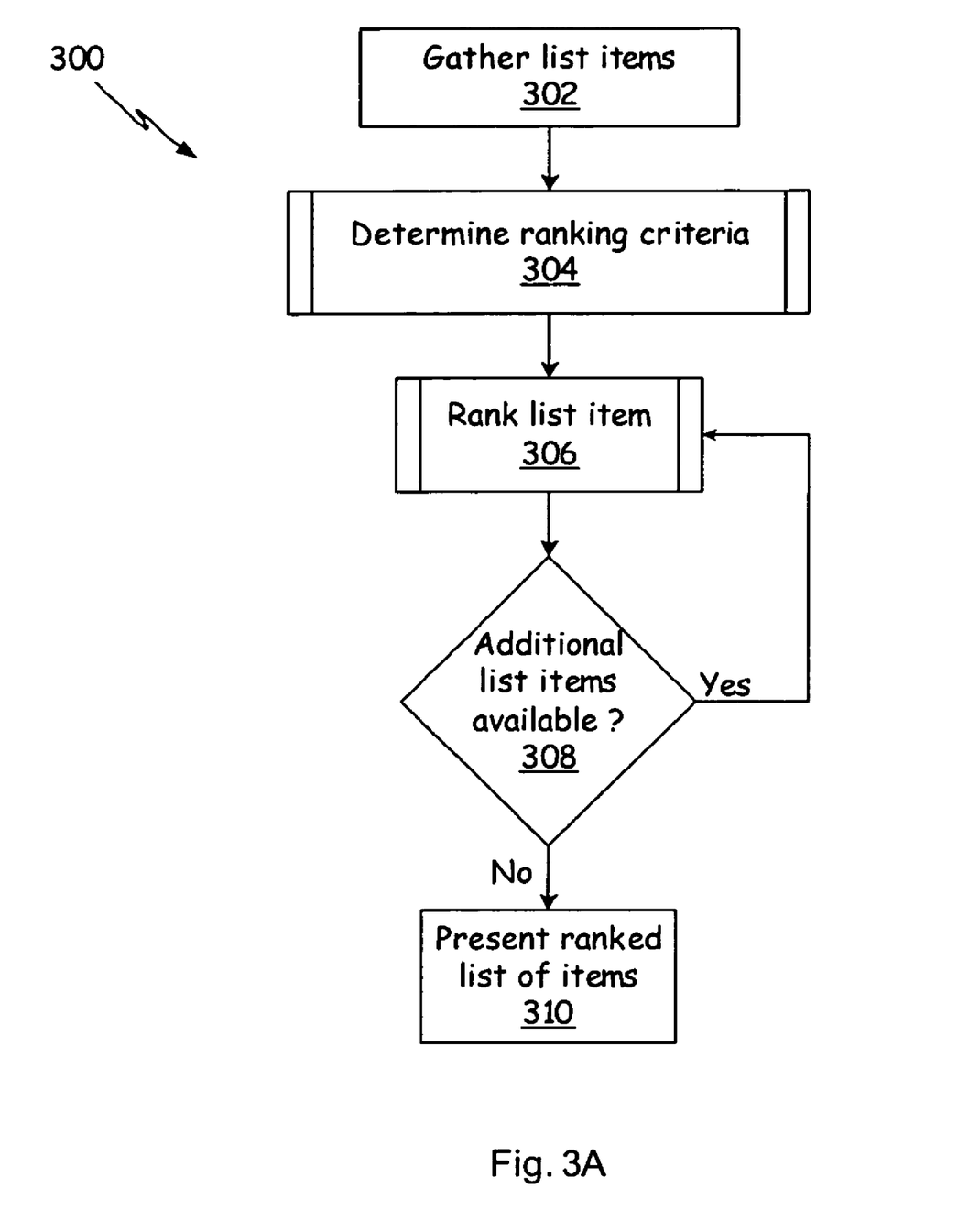
FIG. 3A illustrates a method for determining ranking criteria for a list of items and ranking the list items according to the ranking criteria.

FIG. 3A illustrates a flow diagram 300 of a method for determining ranking criteria for a list of items and ranking the list items according to the ranking criteria, in which items are ranked one-by-one, in relation to items that have already been ranked. Process block 302 depicts gathering a list of items that are to be ranked. Using the embodiment of FIG. 1, search engine 101 of FIG. 1 can provide the list of items in response to receiving search parameters of a search request. Regardless of the procedure used to gather the list items in process block 302, however, process block 304 shows determining ranking criteria for the list of items. At process block 306, a list item is ranked according to the ranking criteria determined at process block 304. Decision block 308 shows that a decision is made, e.g., by ranking engine 104 in FIG. 1, as to whether additional list items are available to be ranked. When all items have been ranked, i.e., when no additional list items are available to be ranked at process block 306, a ranked list of items is presented as illustrated at process block 310.

Heuristics of the ranking can be employed, for example, by ranking engine 104 of FIG. 1. Ranking engine 104 may be seeded to rank search results based on ranking criteria 105 that is created according to specific storage information 106 that is available regarding respective list items that are gathered when, for example, a search is performed in computer system 100 of FIG. 1.

Figure 3B:
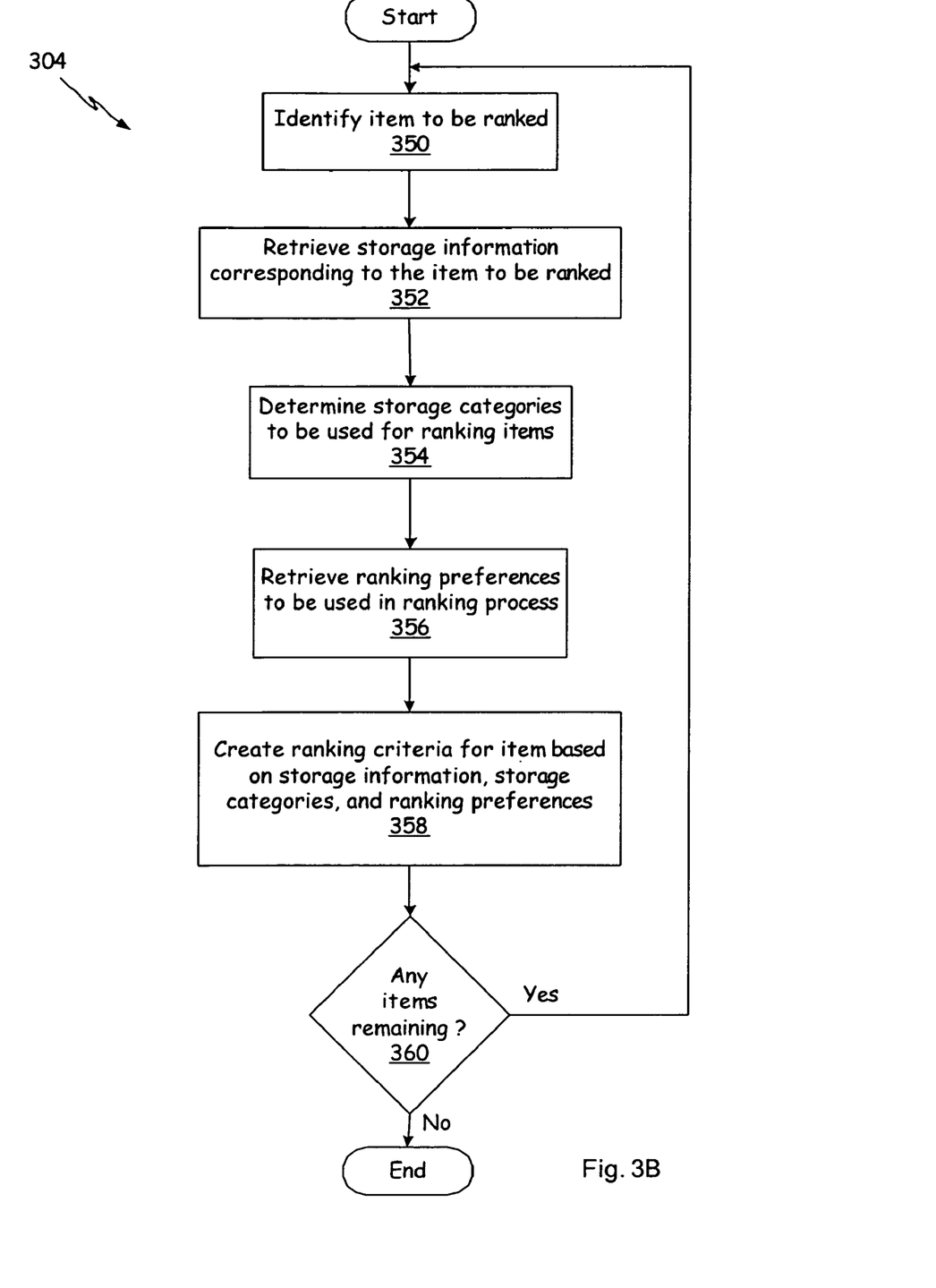
FIG. 3B illustrates the method for determining ranking criteria in greater detail than shown in FIG. 3A.

FIG. 3B illustrates a flow diagram depicting process block 304 in greater detail. The flow diagram 304 shows one embodiment for the method of determining ranking criteria. In process block 350, an item is identified that is to be ranked. Process block 352 shows retrieving storage information such as storage information 106, item metadata 108 and/or other item data 109 of FIG. 1. The storage information corresponds to the item that is to be ranked. At process block 354, storage categories are created that are to be used for ranking items. Ranking preferences that are to be used in the ranking process are retrieved at process block 356. The ranking preferences may originate from various sources including, for example, a preference configuration file used by the storage engine 104. Such a preference configuration file can be created, for example, from user input, administrator input, or other input such as past preference selections, and the like. At process block 358, ranking criteria are created for the given item. These ranking criteria are based on the retrieved storage information, in combination with the created storage categories and ranking preferences retrieved. At decision block 360, the requisite ranking criteria are determined for the list of items gathered (at process block 302), unless it is determined that items remain to be considered at process block 360, in which case the process proceeds to process block 350.

Figure 3C:
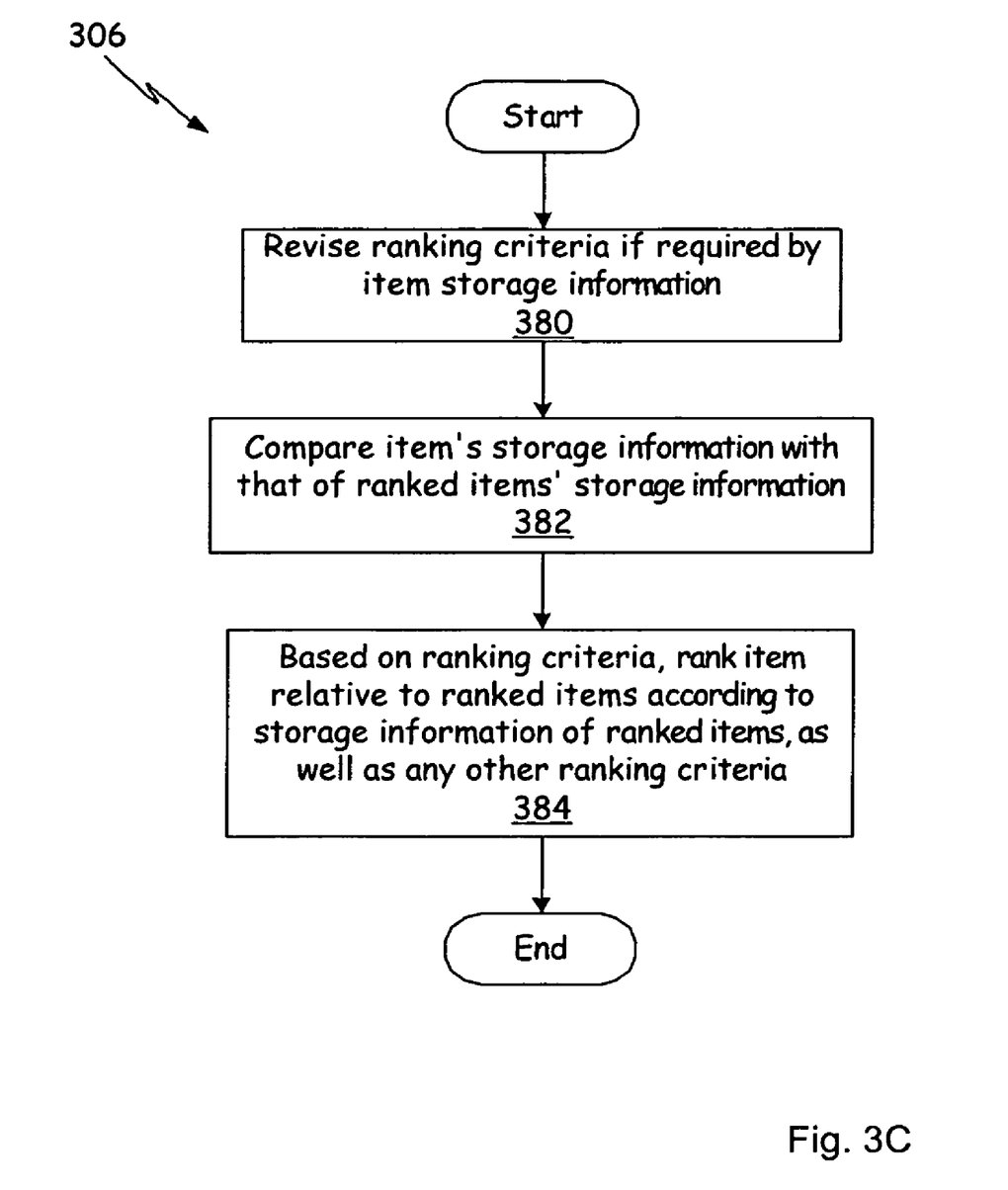
FIG. 3C illustrates one embodiment for ranking items according to at least the ranking criteria determined in the method of FIG. 3A.

FIG. 3C illustrates a flow diagram of process block 306 in greater detail, depicting a method of ranking list items in the method of FIG. 3A. The ranking depicted by flow diagram 306 begins with revising the ranking criteria at process block 380, if the revisions are required by the storage information of the item to be ranked. For example, when storage information is received that includes parameters that were not previously considered in determining ranking criteria, the ranking criteria would need revision. The revisions are important to preserve the accuracy of the desired relevance ranking. At process block 382, the item's storage information is compared with the storage information of the ranked items (i.e., items having already been ranked and already in the ranked list of items), and the item is ready to be ranked based on its rank relative to items already in the ranked list of items. At process block 384, the item is ranked relative to the currently-ranked items according to the respective storage information of the ranked items, as well as any other ranking criteria. In summary, FIGS. 3A-3C show the relevance ranking as such ranking might occur in one embodiment as part of a list of items being presented to a ranking engine for ranking. In other embodiments, ranking criteria may be generated prior to the ranking engine receiving items for ranking, either before or after the list of items has been generated, as is now discussed in connection with FIGS. 4, 5A, 5B, and 6.

Figure 4:
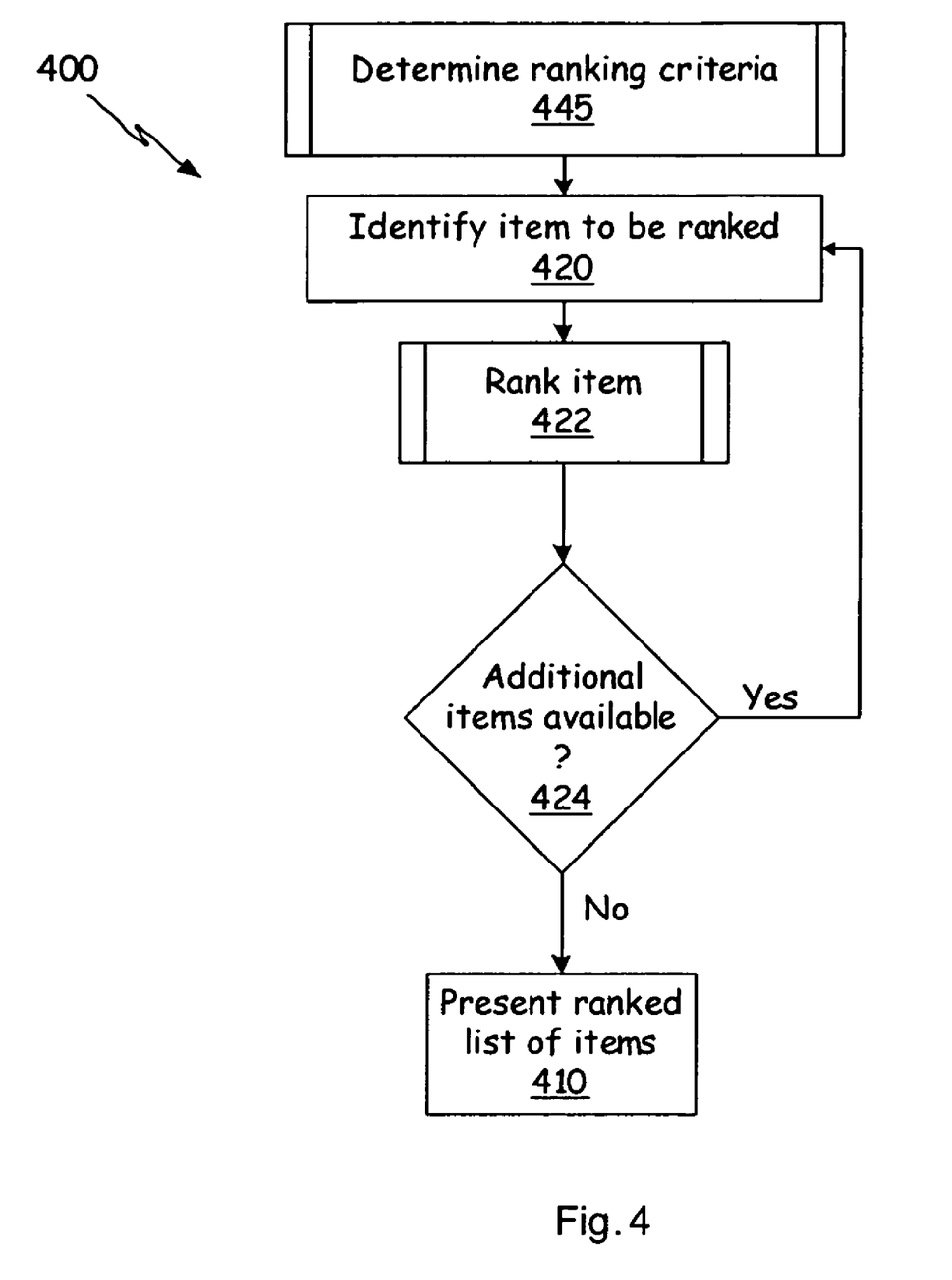
FIG. 4 illustrates a flow diagram that shows generating ranking criteria prior to presenting one or more items to be ranked according to the ranking criteria that has been generated.

FIG. 4 illustrates a flow diagram 400 that shows determining ranking criteria prior to presenting the ranking engine (e.g., ranking engine 104 of FIG. 1) with the list of items to be ranked according to the ranking criteria determined previously. Process block 445 depicts the determination of ranking criteria, in which the ranking criteria is determined a priori. For example, in a ranking engine's (such as ranking engine 104 of FIG. 1) use to determine ranking criteria, general ranking criteria can be determined based on information gleaned from existing system components and characteristics provided by a configuration file. In such an embodiment, the configuration file provides input, e.g., user input, that can be used for generating ranking criteria for ranking based on the available components.

Figure 5A:
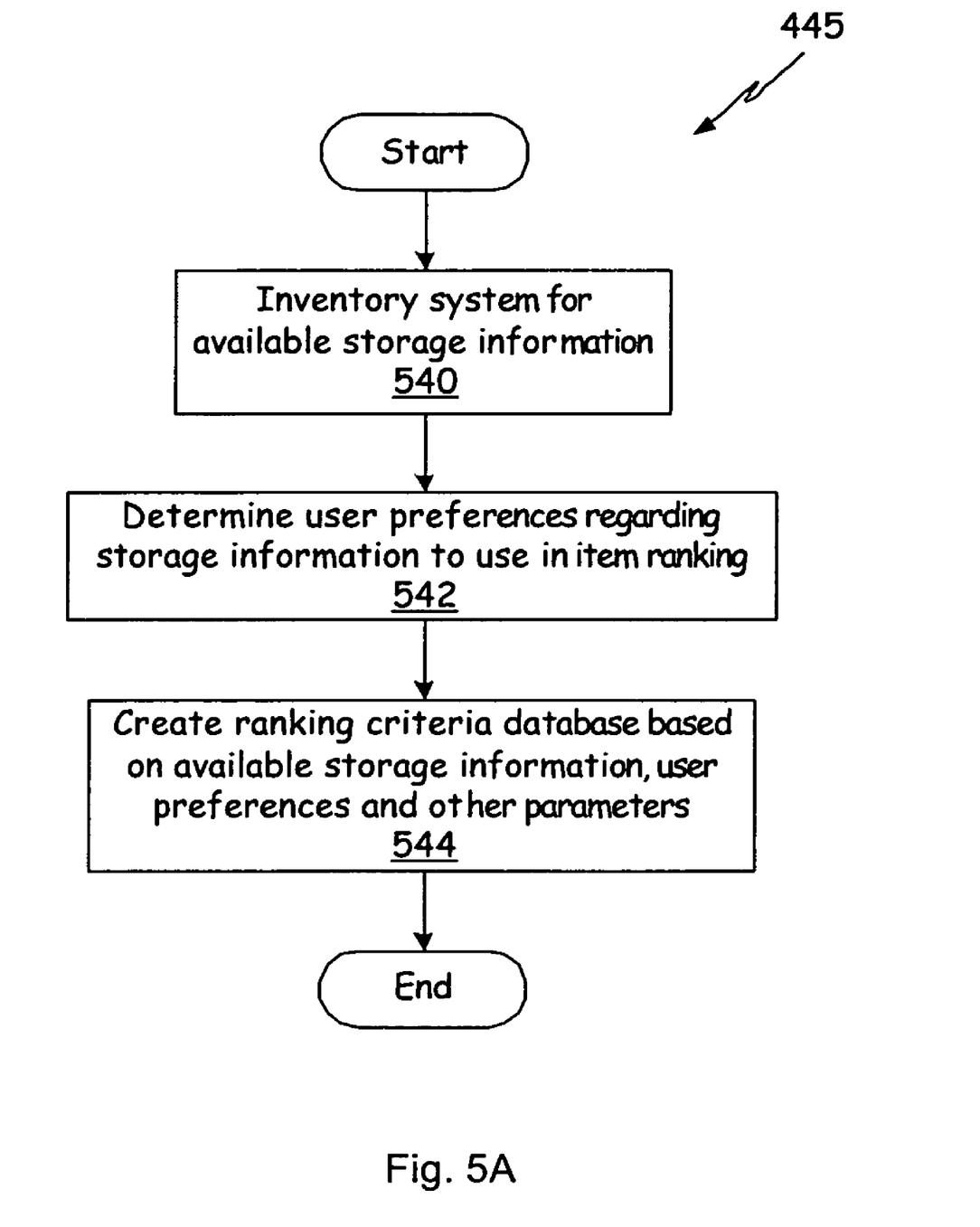
FIG. 5A illustrates one embodiment for implementing ranking heuristics prior to receiving a list of items that are to be ranked.
Figure 5B:
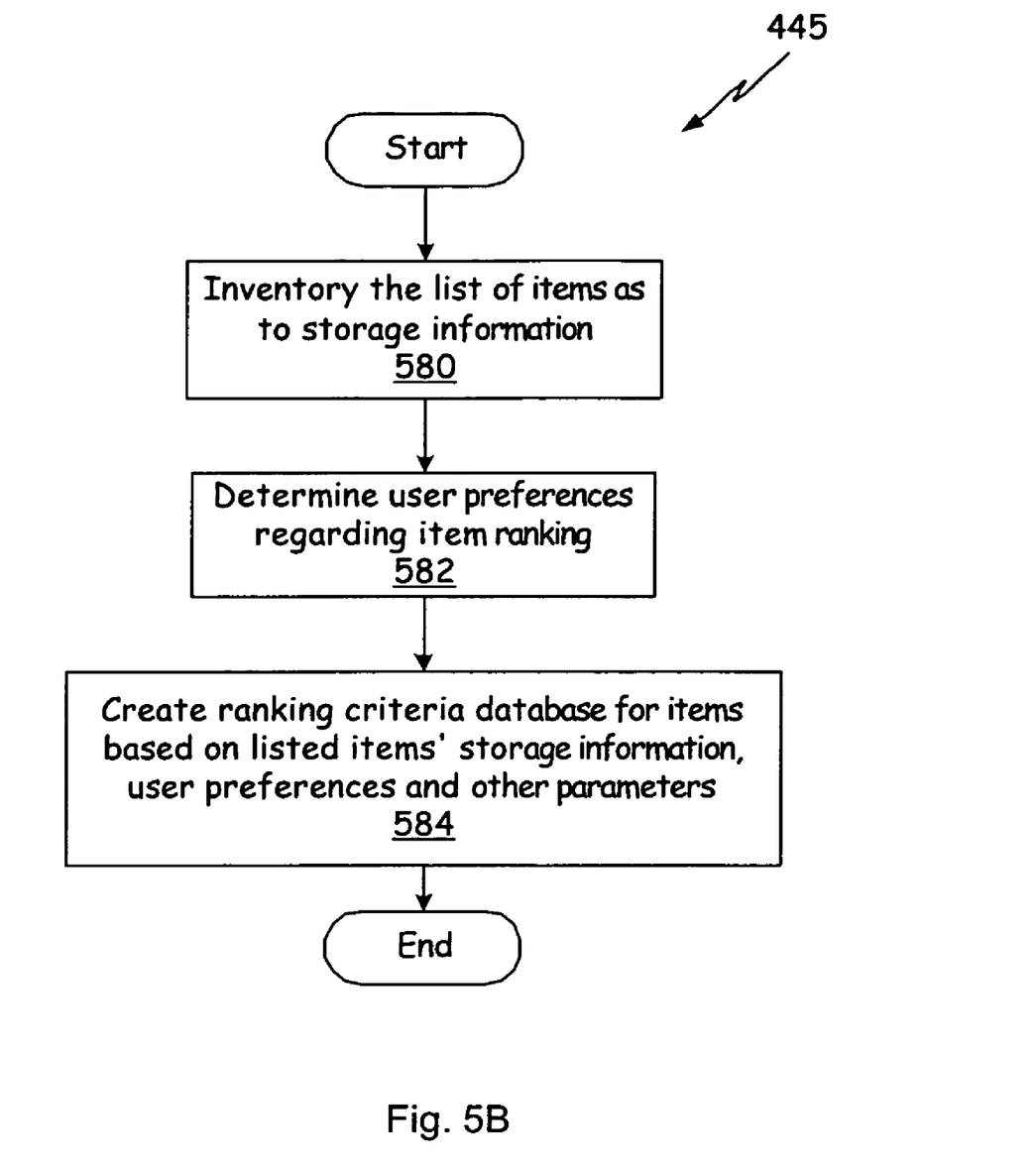
FIG. 5B illustrates one embodiment for implementing ranking heuristics gleaned, at least in part, from a list of items that are to be ranked.

As described in greater detail in relation to FIGS. 5A and 5B, ranking engine 104 determines ranking criteria a priori. In other words, ranking engine 104 can examine computer system 100 of FIG. 1 or the list of items received as input to the ranking process (or even another list of items) for existing system information that can be used to generate a database store of ranking criteria that can then be used to rank items. Due to the a priori nature of the ranking criteria determination, the ranking can occur on an individual item-by-item basis because each item's rank can be determined individually.

Returning to FIG. 4, at process block 420, an item is identified for ranking based on the ranking criteria thus determined. This item is ranked at process block 422. The ranking process of process block 422 is described in greater detail herein in relation to FIG. 6. At decision block 424 of FIG. 4, if it is determined that additional items are available to be ranked, flow diagram 400 returns to process block 420 where the item to be ranked is identified and then ranked at process block 422. At decision block 424, if no additional items are available to be ranked, the process proceeds to process block 410 where a ranked list of items is presented, e.g., to a user, in some fashion.

FIG. 5A illustrates one embodiment for implementing ranking heuristics prior to receiving a list of items that are to be ranked, base on an inventory of the computer system in question. Process block 445 of FIG. 4 is expanded into a flow chart in FIG. 5A to give greater details of this portion of the process. At process block 540 of FIG. 5A, the system, e.g., computer system 100 of FIG. 1, is inventoried to determine available storage information 106. A ranking criteria database may be created based on available storage information 106 and a configuration file. The configuration file can be created from input such as the user input of backup frequencies or preferred file types, for example, and can conform the ranking process to user preferences regarding ranking criteria. The configuration file allows a system to be configured to prioritize items according to given storage information, item metadata, and/or other item data. Of course, when items become available for ranking, the items to be ranked may not utilize all of the information delineated by the ranking criteria.

At process block 542 of flow diagram 445, user preferences regarding item ranking are considered as part of determining a priori ranking criteria. For example, in regard to ranking criteria, a user can request that items stored to a first storage device be given higher priority than items that are stored to a second storage device. In other words, the user may consider the items stored to the first storage device to be more important and to be ranked higher, other factors being equivalent. Characteristics to be the subject of user preferences can range from access time (e.g., the user prefers the first device because the first device has quicker access times than the second device), to cost (e.g., the user prefers the first device because the first device is more expensive than the second device), to other subjective or objective reasons for a preference considered important by the user, and so on. It will be appreciated that other type user preferences will be apparent to one of skill in the art in light of the present disclosure, but, for purposes of expediency, have not been added herein. At process block 544, creating the ranking criteria database is illustrated where the ranking criteria is based on the available storage information, user preferences, and other parameters.

Similar to FIG. 5A, FIG. 5B illustrates one embodiment for implementing ranking preferences to determine ranking criteria as shown in process block 445 of FIG. 4. However, in FIG. 5B, the ranking heuristics are gleaned from a subset of the information considered in FIG. 5A, such as, for example, the list of items to be ranked. Unlike the ranking disclosed in relation to FIGS. 3A and 3B, the list of items in FIG. 5B need not have been retrieved specifically for the purpose of ranking. As indicated at process block 580, the system is inventoried for the list of items in an attempt to obtain storage information that may be relevant to ranking. At process block 582, user preferences that may be pertinent to item ranking are determined and, at process block 584, a ranking criteria database is created for ranking the items in question. The ranking criteria database that is created is based on the listed items' storage information, user preferences, and other parameters considered relevant to the ranking.

Figure 6:
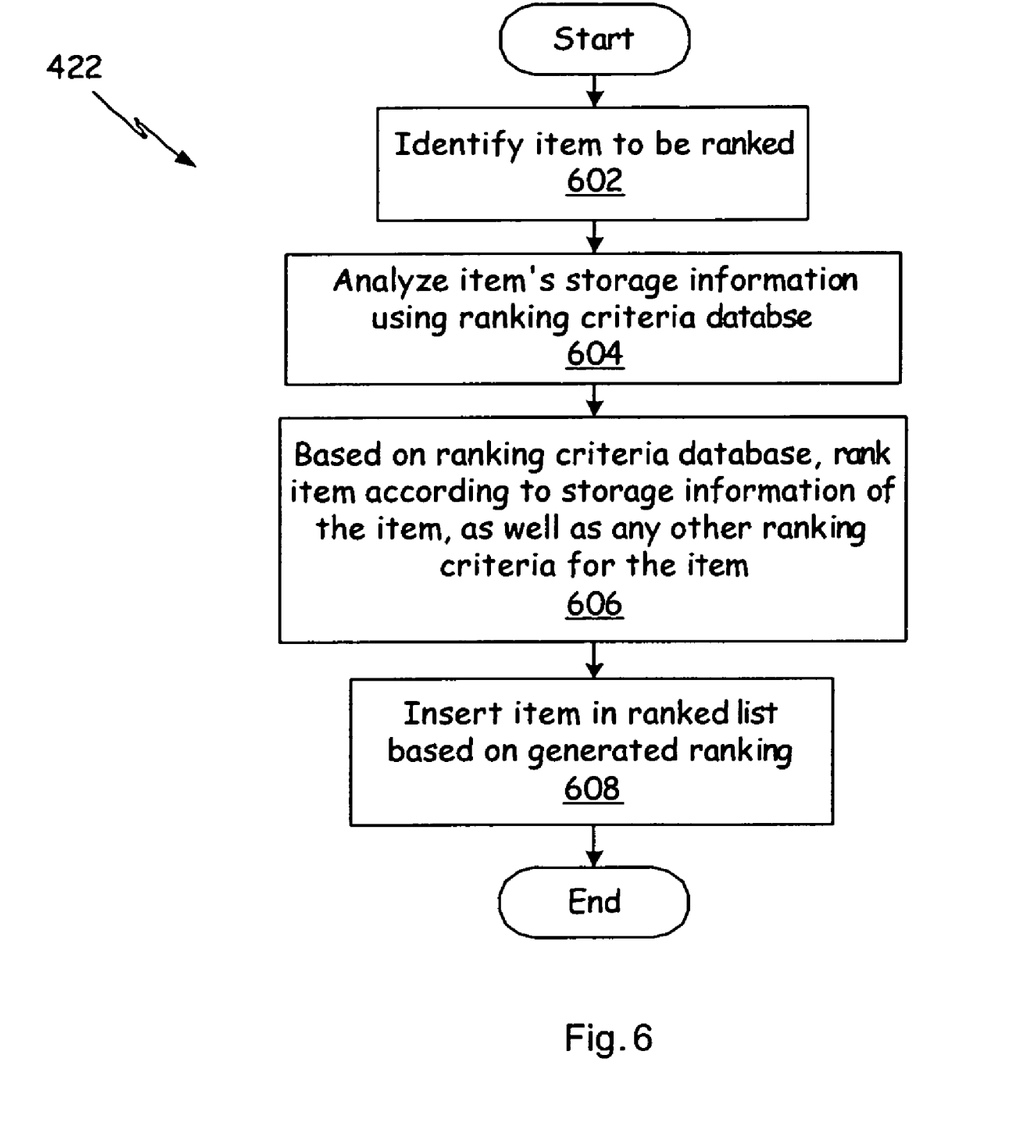
FIG. 6 illustrates one embodiment for ranking an item relative to an existing ranking criteria database.

FIG. 6 illustrates an embodiment for ranking an item relative to an existing ranking criteria database. Process block 422 of FIG. 4 has been expanded into a flow diagram in FIG. 6 to give greater details of the ranking process. At process block 602 of FIG. 6, an item to be ranked is identified. At process block 604, the item's storage information is analyzed using the storage information of the ranking criteria database. At process block 606, the item is ranked according to the ranking criteria database that was determined for ranking purposes. The item ranking that is generated determines where to insert the item into a ranked list of items as depicted in process block 608. The ranking of the FIG. 6 embodiment is according to the storage and/or other information of the item being ranked such that ranking can occur without an item-by-item comparison of storage information and/or other associated characteristics.

Although the present invention has been described in connection with several embodiments, the invention is not intended to be limited to the specific forms set forth herein.

On the contrary, embodiments of the invention are intended to cover such alternatives, modifications, and equivalents as can be reasonably included within the scope of the invention as defined by the appended claims.

What is claimed is:

1. A method comprising:
responsive to receiving a list of items, generating first ranking criteria for the list of items;
performing, using a processor, a first ranking operation with respect to a first item of the list of items, wherein
the first ranking operation is performed using at least first storage information associated with the first item of the list of items,
the first ranking operation is performed based on the first ranking criteria,
the first ranking operation is performed using at least
a storage parameter, and
a backup parameter,
the storage parameter comprises a storage value,
the storage value comprises information regarding a storage destination device used to store the at least one item of the list of items,
the backup parameter comprises
a backup policy for the first item of the list of items, and
a backup value for the first item of the list of items,
the backup policy comprises information regarding a scheduled backup for the at least one item of the list of items,
the backup parameter further comprises a parameter,
item data comprises content of the at least one item of the list of items,
an amount modified associated with the item data represents that portion of the item data that is modified between a first backup of the at least one item of the list of items and a second backup of the at least one item of the list of items,
the parameter represents the amount modified, and
the first ranking criteria further comprise a user privilege of a user who has accessed the at least one item of the list of items; and
performing, using said processor, a second ranking operation with respect to a second item of the list items, wherein the second ranking operation comprises
responsive to the second item having second storage information comprising parameters absent from the first storage information,
generating second ranking criteria, wherein
the second ranking criteria are based in part upon the parameters absent from the first storage information.

2. The method of claim 1, wherein
the generating the first ranking criteria for the list of items further comprises creating a database, wherein
the creating the database is based on the list of items, and
the database comprises the first ranking criteria, and
selecting a subset of the first ranking criteria from the database, wherein the subset is selected based on the first storage information and one or more user preferences; and
the storage parameter further comprises
a storage policy for the at least one item of the list of items.

3. The method of claim 2, wherein
the storage policy comprises at least one of
a storage class for the at least one item of the list of items,
catalog data associated with the at least one item of the list of items, and
configuration settings for the at least one item of the list of items.

4. The method of claim 2, wherein the storage value further comprises at least one of
a size of the at least one item of the list of items,
a most recent access time of the at least one item of the list of items,
a list of most recent access times of the at least one item of the list of items,
an actual storage time of the at least one item of the list of items, and
a type of storage destination device used to store the at least one item of the list of items.

5. The method of claim 4, wherein the backup policy further comprises at least one of
a scheduled backup frequency for the at least one item of the list of items,
catalog data associated with the at least one item of the list of items,
retention settings for the at least one item of the list of items, and
a type of backup destination device for the at least one item of the list of items.

6. The method of claim 4, wherein the backup value comprises at least one of
an actual backup time of the at least one item of the list of items, and
an actual type of backup destination device used to backup the at least one item of the list of items.

7. The method of claim 1, wherein the receiving the list of items further comprises:
searching a computer system for the list of items.

8. The method of claim 1, wherein the first storage information further comprises other parameters relating to at least one item of the list of items.

9. The method of claim 8, wherein the other parameters comprise catalog data for the at least one item of the list of items.

10. The method of claim 1 wherein the list of items comprises at least one of
instant messaging data,
email data, and
user selected data.

11. A method comprising:
gathering first storage information, wherein
the first storage information comprises
a storage parameter, and
a backup parameter,
the storage parameter comprises a storage value,
the storage value comprises information regarding a storage destination device used to store at least one item of a list of items,
the backup parameter comprises
a backup policy, and
a backup value,
the backup policy comprises information regarding a scheduled backup for the at least one item of the list of items,
the backup parameter further comprises a parameter,
item data comprises content of the at least one item of the list of items,
an amount modified associated with the item data represents that portion of the item data that is modified between a first backup of the at least one item of the list of items and a second backup of the at least one item of the list of items, and
the parameter represents the amount modified;

generating first ranking criteria based on the first storage information, wherein
the first ranking criteria are based on at least
the backup policy, and
the backup value, and
the first ranking criteria further comprise a user privilege of a user who has accessed the at least one item on the list of items;
ranking, using a processor, the list of items, wherein the ranking comprises
performing a first ranking operation with respect to a first item of the list of items using at least the first storage information, wherein
the first ranking operation is performed based on the first ranking criteria, and
the first ranking operation is performed for the first item of the list of items using at least the backup policy and the backup value; and
performing a second ranking operation with respect to a second item of the list of items, wherein the second ranking operation comprises
responsive to the second item having second storage information comprising parameters absent from the first storage information, generating second ranking criteria, wherein the second ranking criteria are based in part upon the parameters absent from the first storage information.

12. The method of claim 11 wherein
the first ranking criteria further comprise a user privilege of a user who has accessed the first item of the list of items; and
the first storage information further comprises at least one of
a system characteristic, and
a user preference.

13. The method of claim 12, wherein
the generating the first ranking criteria further comprises
creating a database, wherein
the database comprises the first ranking criteria, and
the creating the database is based on the list of items, and selecting a subset of the first ranking criteria from the database, wherein
the subset is selected based on the first storage information, and
one or more user preferences; and
the one or more user preferences comprise at least one of
user access privileges,
access patterns,
historical modification, and
preferred storage medium.

14. The method of claim 11, further comprising:
receiving the list of items.

15. The method of claim 14, wherein the storage parameter further comprises
a storage policy for the at least one item of the list of items.

16. The method of claim 15, wherein the storage policy comprises at least one of
a storage class for the at least one item of the list of items,
catalog data associated with the at least one item of the list of items, and
configuration settings for the at least one item of the list of items.

17. The method of claim 15, wherein
the storage value further comprises at least one of
a size of the at least one item of the list of items,
a most recent access time of the at least one item of the list of items,
a list of most recent access times of the at least one item of the list of items,
an actual storage time of the at least one item of the list of items, and
a type of storage destination device used to store the at least one item of the list of items.

18. The method of claim 14, wherein the receiving the list of items further comprises:
searching a computer system for the list of items.

19. The method of claim 14, wherein
the backup value for the at least one item of the items, and
the backup policy is a backup policy for the at least one item of the items.

20. The method of claim 19, wherein the backup policy further comprises at least one of
a scheduled backup frequency for the at least one item of the items,
catalog data associated with the at least one item of the items,
retention settings for the at least one item of the list of items, and
a type of backup destination device for the at least one item of the items.

21. The method of claim 19, wherein the backup value comprises at least one of
an actual backup time of the at least one item of the items, and
an actual type of backup destination device used to backup the at least one item of the items.

22. The method of claim 14, wherein
the storage information further comprises other parameters relating to at least one item of the items, and
the other parameters comprise catalog data for the at least one item of the items.

23. The method of claim 14, wherein the list of items comprises at least one of
instant messaging data,
email data, and
user selected data.

24. An apparatus comprising:
a computer readable storage medium; a processor;
means for gathering first storage information, wherein
the means for gathering the first storage information is coupled to a computer,
the first storage information comprises
a storage parameter, and
a backup parameter,
the storage parameter comprises a storage value,
the storage value comprises information regarding a storage destination device used to store at least one item of a list of items,
the backup parameter comprises
a backup policy, and
a backup value,
the backup policy comprises information regarding a scheduled backup for the at least one item of the list of items,
the backup parameter further comprises a parameter,
item data comprises content of the at least one item of the list of items,
an amount modified associated with the item data represents that portion of the item data that is modified between a first backup of the at least one item of the list of items and a second backup of the at least one item of the list of items, and
the parameter represents the amount modified;

means for generating first ranking criteria based on the first storage information, wherein
the first ranking criteria comprise a user privilege of a user who has accessed the at least one item of the list of items,
the means for generating the first ranking criteria is coupled to the means for gathering the first storage information and the computer, and
the first ranking criteria are based on at least
the backup policy, and
the backup value;
first ranking means for performing a first ranking operation of the list of items, wherein the first ranking means comprises
means for ranking the first item of the list of items based on at least the first storage information,
means for ranking the first item of the list of items based on the first ranking criteria, and
means for ranking the first item of the list of items based on at least the backup policy and the backup value; and
second ranking means for performing a second ranking operation with respect to a second item, wherein the second ranking means comprises
means for, responsive to the second item having second storage information comprising parameters absent from the first storage information, generating second ranking criteria, wherein the second ranking criteria are based in part upon the parameters absent from the first storage information.

25. The apparatus of claim 24, wherein
the first ranking criteria further comprise user privileges of a user who has accessed an item on the list of items; and
the first storage information further comprises at least one of
a system characteristic, and
a user preference.

26. The apparatus of claim 24, further comprising:
means for receiving the list of items.

27. The apparatus of claim 26, wherein
the means for generating the first ranking criteria further comprises
means for creating a database, wherein
the means for creating the database further comprises
means for creating the database based on the list of items, and
the database comprises the first ranking criteria, and
means for selecting a subset of the first ranking criteria from the database,
wherein
the subset is selected based on
the first storage information, and
one or more user preferences; and
the storage parameter further comprises
a storage policy for the at least one item of the list of items.

28. The apparatus of claim 26, wherein the means for receiving the list of items further comprises:
a means for searching a computer system for the list of items.

29. A computer readable storage medium comprising instructions executable by a processor to implement a method, the method comprising:
gathering first storage information, wherein
the first storage information comprises
a storage parameter, and
a backup parameter,
the storage parameter comprises a storage value,
the storage value comprises information regarding a storage destination device used to store at least one item of a list of items,
the backup parameter comprises
a backup value for a first item of the list of items, and
a backup policy for the first item of the list of items,
the backup policy comprises information regarding a scheduled backup for the at least one item of the list of items,
the backup parameter further comprises a parameter,
item data comprises content of the at least one item of the list of items,
an amount modified associated with the item data represents that portion of the item data that is modified between a first backup of the at least one item of the list of items and a second backup of the at least one item of the list of items, and
the parameter represents the amount modified;
generating first ranking criteria based on the first storage information, wherein
the first ranking criteria further comprise a user privilege of a user who has accessed the at least one item of the list of items, and
the first ranking criteria are based on at least
the backup policy for the first item of the list of items, and
the backup value for the first item of the list of items; and
ranking, using a processor, the list of items, wherein the ranking comprises
performing a first ranking operation with respect to the first item of the list of items using at least the first storage information, wherein
the first ranking operation is performed based on the first ranking criteria, and
the first ranking operation is performed for the first item of the list of items using at least the backup policy and the backup value, and
performing a second ranking operation with respect to a second item of the list of items, wherein the second ranking operation comprises responsive to a second item having second storage information comprising parameters absent from the first storage information, generating second ranking criteria, wherein
the second ranking criteria are based in part upon the parameters not present in the first storage information.

30. The computer readable storage medium of claim 29, wherein
the first ranking criteria further comprise user privileges of a user who has accessed an item on the list of items; and
the first storage information further comprises at least one of a system characteristic, and
a user preference.

31. The computer readable storage medium of claim 29, wherein the instructions executable by the processor further comprise instructions, to implement the method, for:
receiving a list of items; and
ranking the list of items.

32. The computer readable storage medium of claim 31, wherein
the generating the first ranking criteria further comprises
creating a database, wherein
the creating the database is based on the list of items, and
the database comprises the first ranking criteria, and selecting a subset of the first ranking criteria from the
database, wherein
the subset is selected based on
the first storage information, and
one or more user preferences; and
the storage parameter further comprises
a storage policy for the at least one item of the list of
items.

33. The computer readable storage medium of claim 31, wherein the instructions further comprise instructions, to implement the method, for searching a computer system for the list of items.

* * * * *